Patented Oct. 8, 1929

1,730,417

UNITED STATES PATENT OFFICE

HENRY A. GARDNER, OF WASHINGTON, DISTRICT OF COLUMBIA

INSULATING FILAMENT

No Drawing. Application filed January 10, 1928. Serial No. 245,812.

The present invention relates to artificial filaments and resides more particularly in artificial filaments consisting essentially of a cellulosic material and containing an added insulating material.

It is known that pure silk filaments possess a considerable degree of electrical resistance and hence find applicability in the electrical industry in the preparation of non-conducting coverings for conductor wires such, for instance, as the wires used in the telephone instrument. It has been demonstrated that the known artificial filaments such as artificial silk generally are not as satisfactory as pure silk for electrical insulating purposes.

An object of the present invention, therefore, is to provide a relatively non-conducting artificial filament having improved properties in this respect.

I have found that it is possible to prepare artificial filaments, such as, for example, artificial silk, having insulating or non-conducting properties equal or superior to those possessed by natural silk, by commingling with the solution of cellulosic material from which the filaments are to be formed a material known to be a relatively good non-conductor, extruding the resulting composition through capillaries and further processing the so-formed filaments in the known manner. I have found that the non-conducting material becomes a part of the filament, giving to it a relatively high degree of electrical resistance and other desirable properties with the result that the new filament may be a non-conductor as good as, if not better than, natural silk.

The cellulosic filament-forming constituent of the extrudable composition may be a solution of cellulose acetate, cellulose nitrate, acetyl-nitro-cellulose, viscose, cupro-ammonium cellulose, or in general any of the known filament-forming esters or ethers of cellulose, or regenerated cellulose. As the non-conducting material to be incorporated in the filaments there may be used any of the materials known to possess relatively high electrical resistance, including mica and other non-conducting materials, and natural and synthetic resins. Among the natural resins suitable for this purpose are: shellac, dammar, rosin esters and the like. Some of the suitable synthetic resins are: phenol-formaldehyde condensation products, glycerin-phthalic acid condensation products, urea-formaldehyde condensation products and the like.

The following will serve to illustrate the invention, it being understood that the invention is not limited to the precise starting materials mentioned nor to the relative proportion of non-conducting component to filament-forming component, excepting as may be required by the terms of the appended claims:

*Example 1.*—About 40 grams of a resin solution, containing approximately 20 grams of phenol-formaldehyde synthetic resin, are incorporated by thorough mixing into an acetone solution of 100 grams of cellulose acetate. The resulting composition is projected through capillary orifices, and the resulting filaments,—after coagulation,—are dried and further processed in the known manner.

For the phenol-formaldehyde synthetic resin of the above example I may substitute a natural resin such as for example shellac, or another synthetic resin; or, I may replace a part of the synthetic resin content by an equivalent of a natural resin.

*Example 2.*—About 10 grams, more or less, of finely divided mica are thoroughly milled with 20 grams of an acetone solution of a resin containing approximately 5 grams of phenol-formaldehyde resin and 5 grams of shellac. After thorough milling, the resulting suspension is incorporated, by thorough mixing, into an acetone solution of 100 grams of cellulose acetate. The resulting composition is projected through capillarly orifices,—either into the air or, if desired, into a suitable coagulating medium,—and the resulting extruded filaments are dried and further processed in the manner known to the artificial silk art.

I claim:

1. As a new article of manufacture, a cellulosic artificial filament containing an electrically non-conducting resin and a finely divided non-conducting micaceous substance in amounts sufficient to produce an electrically non-conducting effect.

2. As a new article of manufacture, a cellulosic artificial filament containing an electrically non-conducting synthetic resin and finely divided mica in amounts sufficient to produce an electrically non-conducting effect.

3. As a new article of manufacture, a cellulosic artificial filament containing an electrically non-conducting synthetic resin, shellac, and finely divided mica in amounts sufficient to produce an electrically non-conducting effect.

In testimony whereof, I affix my signature.

HENRY A. GARDNER.